United States Patent
Massey et al.

(10) Patent No.: US 12,264,459 B2
(45) Date of Patent: Apr. 1, 2025

(54) LOADING MACHINE WITH VISUAL REFERENCE SYSTEM

(71) Applicant: Caterpillar Inc., Peoria, IL (US)

(72) Inventors: Andrew J. Massey, Matlock (GB); Joel R. Grimes, Holly Springs, NC (US)

(73) Assignee: Caterpillar Inc., Peoria, IL (US)

( * ) Notice: Subject to any disclaimer, the term of this patent is extended or adjusted under 35 U.S.C. 154(b) by 404 days.

(21) Appl. No.: 17/459,792

(22) Filed: Aug. 27, 2021

(65) Prior Publication Data

US 2023/0060815 A1    Mar. 2, 2023

(51) Int. Cl.
| | |
|---|---|
| *E02F 9/26* | (2006.01) |
| *E02F 3/34* | (2006.01) |
| *E02F 9/20* | (2006.01) |
| *G01C 15/00* | (2006.01) |
| *G05D 1/00* | (2006.01) |
| *H04N 7/18* | (2006.01) |

(52) U.S. Cl.
CPC .......... *E02F 9/26* (2013.01); *E02F 3/34* (2013.01); *E02F 9/205* (2013.01); *G01C 15/004* (2013.01); *G05D 1/0038* (2013.01); *H04N 7/185* (2013.01)

(58) Field of Classification Search
CPC .... E02F 3/34; E02F 9/205; E02F 9/26; G01C 15/004; G05D 1/0038; G05D 2201/0202; H04N 7/185
See application file for complete search history.

(56) References Cited

U.S. PATENT DOCUMENTS

| | | | | |
|---|---|---|---|---|
| 4,393,606 A | * | 7/1983 | Warnecke | E02F 3/435 172/430 |
| 9,824,490 B1 | * | 11/2017 | Côté | G06T 19/006 |
| 2010/0245542 A1 | * | 9/2010 | Kim | G01B 11/00 37/444 |
| 2014/0334169 A1 | | 11/2014 | Ewert | |
| 2018/0051446 A1 | * | 2/2018 | Yoshinada | E02F 9/264 |
| 2019/0161943 A1 | | 5/2019 | Frank | |
| 2020/0018045 A1 | | 1/2020 | Sano et al. | |
| 2020/0340205 A1 | | 10/2020 | Naito | |
| 2021/0040711 A1 | | 2/2021 | Seki et al. | |
| 2021/0043085 A1 | * | 2/2021 | Kreiling | E02F 3/96 |
| 2021/0250561 A1 | * | 8/2021 | Takahama | G09G 5/00 |

FOREIGN PATENT DOCUMENTS

| | | |
|---|---|---|
| CN | 112041508 A | 12/2020 |
| WO | WO 2011/067456 A1 | 6/2011 |

OTHER PUBLICATIONS

Written Opinion and International Search Report for Int'l. Patent Appln. No. PCT/US2022/038425, mailed Nov. 25, 2022 (10 pgs).

\* cited by examiner

*Primary Examiner* — Saul Rodriguez
*Assistant Examiner* — Brendan P Tighe

(57) ABSTRACT

A visual reference system can be used with a loading machine such as a bucket loader having a bucket that can be vertically articulated with respect to a work surface. The visual reference system can include one or more illumination devices configured to project a visual fiducial beam toward the work surface. The visual fiducial beam can create a fiducial indication of where the bucket will contact the work surface when lowered adjacent the work surface. The visual reference system can assist in operation of the loading machine by enabling an operator to visually perceive the expected contact point between the bucket and work surface.

19 Claims, 4 Drawing Sheets

LOADING MACHINE WITH VISUAL REFERENCE SYSTEM

TECHNICAL FIELD

This patent disclosure relates generally to a loading machine for loading material to a material receptacle and, more particularly, to an illumination device adapted to indicate the expected contact point of a lifting implement when lowered to a work surface.

BACKGROUND

Loading machines are commonly used at worksites such as mines, quarries, and construction sites to move materials to different locations within and/or away from the worksite. Examples of loading machines include bucket loaders, which may sometimes be referred to as wheel loaders. Loading machines typically include a bucket for accommodating the material that is coupled to a lifting implement such as a mechanical linkage that is movable through various positions and spatial configurations. An operator of the loading machine can control various input devices to conduct a sequence of operations to maneuver the bucket and lifting implement and complete an operation. One common task for a loading machine is to maneuver the lifting implement to load the bucket with material and then maneuver the loading machine to transport the material about the worksite.

The operator may be located in an operator station that can be supported on the machine frame of the loading machine in a position to provide visibility about the worksite. However, because the lifting implement and bucket are often pivotally connected to the front of the machine frame and can be articulated with respect to the operator station, the lifting implement may block or obstruct the operator's view of the worksite during use. The operator must also estimate and guide the loading implement to avoid unintended contact with any structures or objects located about the worksite. In addition, in recent years, there have been efforts and proposals to enable remote operation of the material handling event by inclusion of cameras on the loading machine that allows the operator to visually view the loading implement and the worksite and use a remote control to remotely conduct to the operation. However, cameras and remote visual displays may not always capture optimal images or enable the operator to accurately maneuver and guide the work implement. The present application is directed to a system and method for assisting the operator of a loading machine to conduct the material handling operation in both circumstances where the operator is located onboard the loading machine or remotely operating the machine.

SUMMARY

The disclosure describes, in one aspect, a loading machine having a machine frame disposed on a plurality of propulsion devices for propulsion over a work surface and an operator station disposed on the machine frame at a position having visibility over the work surface. The loading machine also includes a lifting implement pivotally connected at its proximal end to the machine frame by a pivot joint to articulate the lifting implement with respect to the machine frame. The distal end connect of the work implement is connected to a bucket for accommodating material. The loading machine can also include a visual reference system having at least one illumination device disposed on the machine frame configured to project a visible fiducial beam to indicate an expected contact point between the bucket and the work surface In another aspect, the disclosure describes a system for remote control of a loading machine. The loading machine can include a machine frame supported on a plurality of propulsion devices for propelling the machine over a work surface, and a lifting implement connected to the machine frame to vertically articulate with respect to the machine frame. The lifting implement can include a bucket at its distal end to receive material in a material handling operation. The system may include a camera disposed on the machine frame configured to capture a visual image of the bucket when lowered to an expected contact point adjacent the work surface. The system may further include an illumination device disposed on the machine frame and configured to project a visible fiducial beam to illuminate the expected contact point prior to contact of the bucket with the work surface. A remote control can communicate with the camera and can include a visual display to reproduce the visual image In yet another aspect, the disclosure describes a machine including a machine frame disposed on a plurality of propulsion devices to propel the machine over a work surface and a work implement having a working edge and connected to the machine frame by a pivot joint to vertically articulate the work implement with respect to the machine frame. The machine can also include a visual reference system with one or more an illumination devices on the machine frame configured to project a visible fiducial beam to indicate an expected contact point between the work edge and the work surface.

DETAILED DESCRIPTION

Figure 1:
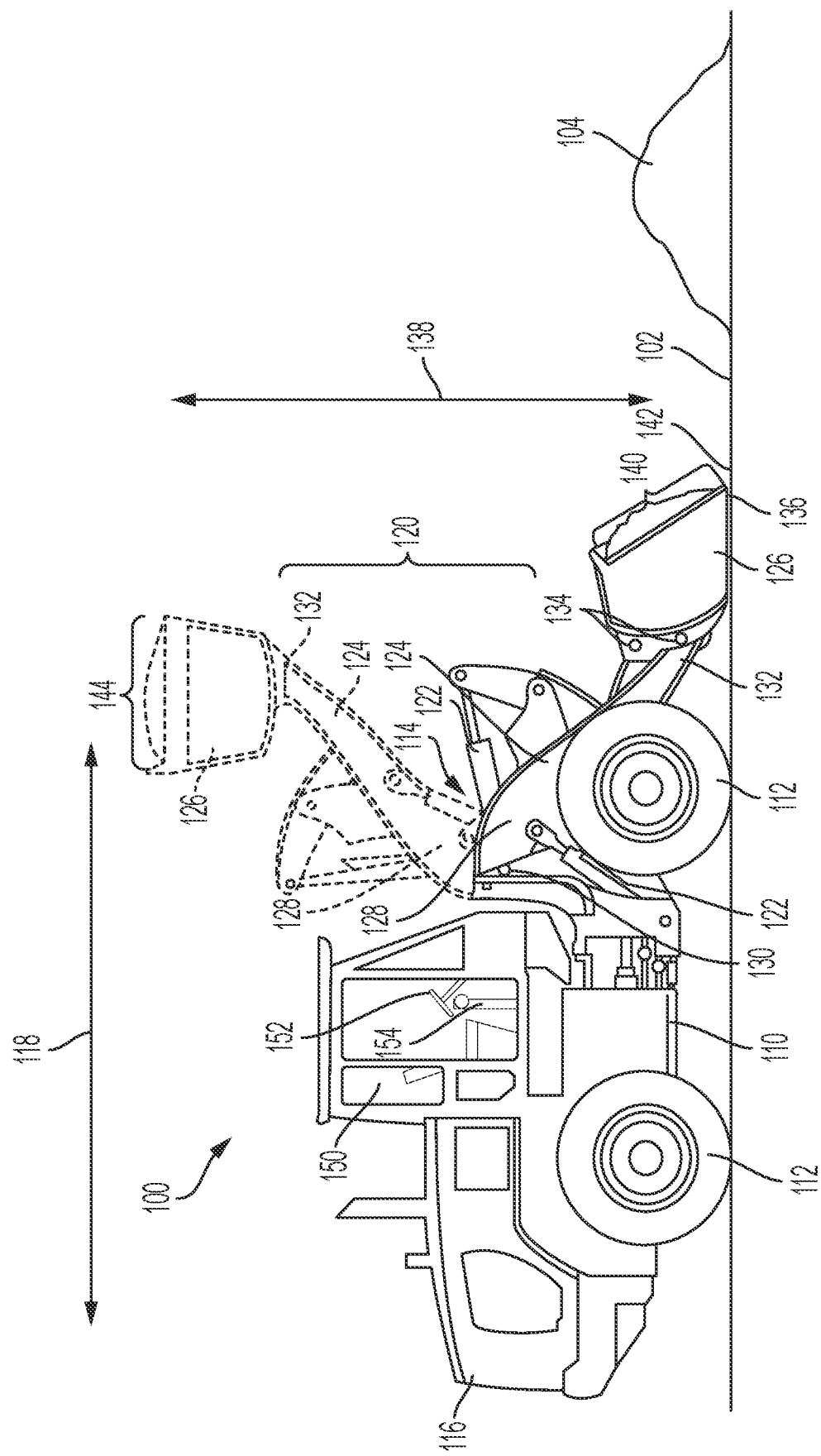
FIG. 1 is a side elevational, diagrammatic view of a loading machine in the embodiment of a bucket loader having a loading implement with a bucket that can vertically articulate with respect to the frame of the machine and that is configured with an illumination device configured to project a visible fiducial beam to visually indicate the expected contact point of the bucket when lowered to the work surface.

Now referring to the drawings, wherein whenever possible like reference numbers will refer to like elements, there is illustrated in FIG. 1a loading machine 100 in the embodiment of a bucket loader for material handling operations such as loading, transporting, and dumping material about a worksite. Examples of material, which may be deposited on a work surface 102 in piles 104, include earthen materials, construction aggregate, concrete, mined ores, coal, and the like and examples of worksites include construction sites, mines, a quarry, an agricultural site, and the like and which may be paved, unpaved, outdoors, indoors, etc. While the illustrated loading machine 100 is a bucket loader, aspects of the disclosure may apply to other types of loading machines like skid loaders, backhoe loaders, bulldozers, and the other earth moving and material handling machines.

The loading machine 100 can include a machine frame 110 or chassis supported on a plurality of propulsion devices 112 for mobility and propelling the machine over the work surface 102 which the propulsion devices 112 contact. The propulsion devices 112 are rotatable wheels that are rotatably connected via joints toward the front end 114 and toward the rear end 116 of the machine frame 110. The wheels may be configured as steer wheels that can be turned with respect to the machine frame 110 to enable the loading machine 100 to maneuver and follow a designated course or may be configured as drive wheels that are operatively coupled to a power source like an internal combustion engine via a drivetrain to transmit a tractive force to the work surface 102 causing the loading machine 100 to move over the work surface. The propulsion devices 112 enable the loading machine 100 to travel over the work surface 102 in a travel direction 118 (indicated by an arrow) in either a forward direction or a reverse direction. Another example of propulsion devices 112 include continuous tracks that can translate with respect to the machine frame 110 to propel the loading machine 100 over the work surface 102.

To accommodate or interact with the material during the material handling operation, the loading machine 100 can include a lifting implement 120 that is pivotally connected to the front end 114 of the machine frame 110. To vertically articulate the lifting implement 120 with respect to the machine frame 110, the lifting implement can be operatively associated with a hydraulic system including a plurality of hydraulic actuators 122 like hydraulic cylinders that are braced between the machine frame 110 and the lifting implement 120 and that can extend and retract under the effect of pressurized hydraulic fluid causing the lifting implement to pivot upwards and downwards. The lifting implement 120 can be a mechanical linkage and can include a rigid link or implement arm 124 and a bucket 126 configured as an opened trough that can receive and accommodate material. In an embodiment, the implement arm 124 can be a rigid, elongated structure formed of structural steel having a proximal end 128 pivotally connect to the machine frame 110 by a pivot joint 130 and a distal end 132 operatively coupled to the bucket 126. In an embodiment, a pair of implement arms 124 spaced apart and symmetrically arranged can be included with the lifting implement 120. In an embodiment, the bucket 126 may be coupled to the distal end 132 of the implement arm 124 by a second pivot joint 134 to pivot during loading, hauling, and dumping operations. In an embodiment, the second set of pivot joints 134 connecting the bucket 126 to the distal end 132 of the implement arm 124 can be configured as quick coupling joints so that different types of buckets can be coupled to the lifting implement 120 for different operations. The bucket 126 may further include a working edge 136 or working point that engages the work surface 102, for example, to cleave into or displace the piles 104. If a pair of implement arms are provided, pairs of the first and second pivot joints 130, 134 may be included.

During a material handling operation, including loading, hauling, and dumpling, the lifting implement 120 can be moved through various maneuvers that raise and/or lower the bucket 126 in a vertical direction 138, indicated by an arrow. For example, in lowered position 140, the bucket 126 can be proximate the work surface 102 to cleave into the pile 104 and to receive a load of material. When in the lowered position 140, the bucket 126 can be adjacent to the work surface 102 at a predetermined or expected contact point 142. In particular, the expected contact point 142 may be a predetermined or fixed position between the working edge 136 and the front end 114 of the machine frame 110 because the rigid implement arm 124 has fixed length. Accordingly, when in the lowered position 140, the bucket 126 will always contact the work surface 102 at the expected contact point 142 that will always be a predetermined distance in front of the front end 114. To haul the material about the worksite, the lifting implement 120 can also vertically articulate and raise the bucket 126 to a raised position 144 where the bucket is lifted and held a vertical distance above the work surface 102 and can support the material at the raised position. In addition, the lifting implement 120 can move and position the bucket 126 at various other positions and angles along the vertical direction 138.

In an embodiment, to accommodate a human operator, the loading machine 100 can include an operator's cab or operator station 150 supported on the machine frame 110 at a vertically elevated position to provide a visual overview of the worksite and the lifting implement 120. The operator station 150 can accommodate various operator input devices that the operator can interact with to control operation of the loading machine 100. Examples of operator input devices include joysticks, steering columns, pedals and the like. A particular example can be a steering wheel 152 that allows the operator to turn the propulsion devices 112 with respect to the machine frame 110 and guide the loading machine 100 over the work surface 102. Another example of an operator input device can be a lifting stick 154 operatively associated with the lifting implement 120 and hydraulic actuators 122 to vertically articulate the implement arm 124 with respect to the machine frame 110 to raise and lower the bucket 126 along the vertical direction 138.

Figure 2:
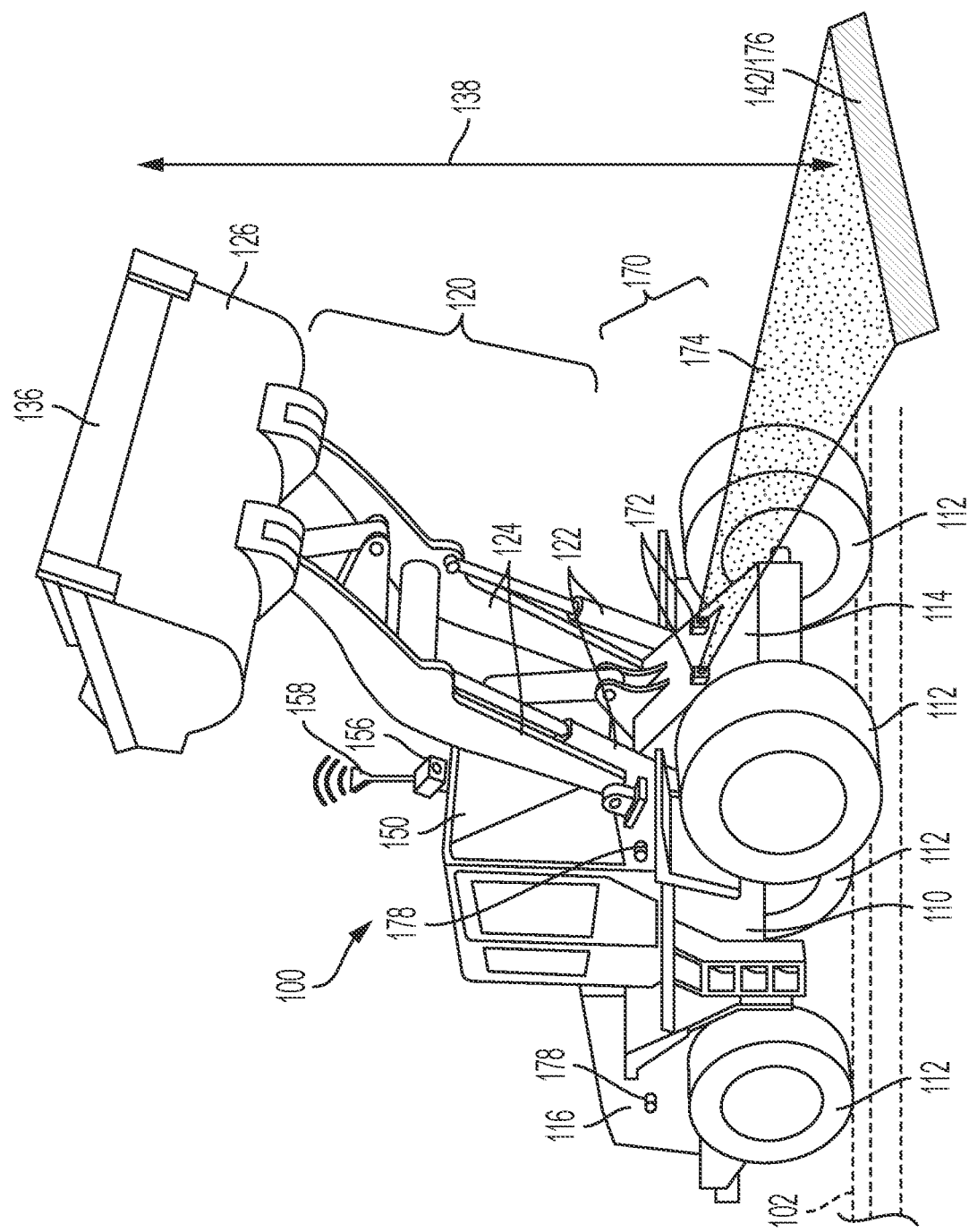
FIG. 2 is a perspective view of the bucket loader configured for remote operation with a camera disposed on the machine and having an illumination device configured to project a visible fiducial beam.

In another embodiment, the loading machine 100 can be configured for remote operation and some or all of the foregoing operator input devices can be located remotely from the onboard operator station 150. For example, referring to FIG. 2, the loading machine 100 can include one or more cameras 156 or other types of image capturing devices disposed on the machine frame 110 at various locations to provide visibility about the worksite. In particular, the cameras 156 can be disposed with a view toward the front end 114 of the loading machine 100 so that the lifting implement 120 and the expected contact point 142 where the bucket 126 can contact the work surface 102 are within the line of view of the cameras. The cameras 156 may be video cameras capable of capturing live video and may include features that enable the camera to focus at different locations or depth perceptions. Cameras 156 may also be hingedly mounted to the machine frame 110 via one or more pivot joints and actuators to enable the cameras to pan around to different locations about the worksite.

The cameras 156 can be operatively associated with a transmitter 158, which may be a transponder capable of sending and receiving data signals that can encode and transmit the images captured by the cameras. The data signals transmitted by the transmitter 158 can be received by a remote control 160 operatively associated with a receiver 162, which also may be a transponder capable of sending and receiving data signals. Communication may be wireless, i.e., via radio signals or other electromagnetic technology, or may be conducted through conductive data cables. The remote control 160 may include non-transitory, computer readable data media such as memory and may include data processing devices such as microprocessors to read, manipulate, and write computer processable data. Example of microprocessors include a field programmable gate array (FPGA), an application specific integrated circuit (ASIC), and other programmable logic processing devices. The computer readable media and the data processing devices can be capable of translating and processing the data signals received from the transmitter 158 associated with the cameras 156. The remote control may also include a visual display 164 capable of visually reproducing the images captured by the cameras 156 so that the images are visually perceptible to a human operator. The visual display 164 may be a liquid crystal display (LCD screen) or other type of flat panel display, and may be a touch-sensitive screen. The remote control 160 can include various input devices like keypads, dials, and switches or their representation on the touch-sensitive screen, that a human operator can interface with to send transitory data signals representing operational instructions to operate the loading machine 100. For example, the remote control 160 can operatively control the lifting implement 120 by vertically articulating the lifting implement to raise and lower the bucket 126 along the vertical direction 138 with respect to the work surface 102.

When operating the lifting implement 120 during a material handling operation, it can be beneficial to have a precise knowledge of the location of the expected contact point 142 where the bucket 126 will contact the work surface 102 when in the lowered position (the term contact point used herein after can refer to the expected contact point where the bucket will contact the work surface and the actual contact point where the bucket does contact the work surface). For example, by understanding the location of the expected contact point 142, the operator can assess and avoid unintended contact with other objects about the worksite when maneuvering the lifting implement 120. Understanding the location of the expected contact point 142 can also assist in guiding operation of the lifting implement 120 through the loading, hauling, and dumping operations. However, perceiving or estimating the location of the expected contact point 142 can be difficult for various reasons. For example, visually perceiving the expected contact point 142 from the operator station 150 may not be possible due to the visual angle of the operator station 150 and the line of sight with respect to the expected contact point 142, or the expected contact point 142 may be obstructed from operator view by the work implement 120 as it is vertically raised and lowered with respect to the machine frame 110. In addition, the expected contact point 142 can be difficult to perceive through the visual display 164 of the remote control 160, which may not be capable of reproducing a three-dimensional image or because the visual display inaccurately or poorly presents the depth perception of the loading machine 100 with respect to the expected contact point 142.

Accordingly, to visually assist operation and maneuvering of the work implement 120, the loading machine 100 can be associated with a visual reference system 170 that provides a fiducial indication of the location of the expected contact point 142 where the bucket 126 is estimated to contact the work surface 102. The visual reference system 170 can include one or more illumination devices 172 disposed on the machine frame 110 of the loading machine 100 and that are configured to project a visible fiducial beam 174 of light indicating the location of the expected contact point 142. For example, the illumination devices 172 can be positioned and focused to illuminate the expected contact point 142 wherein the working edge 136 of the bucket 126 will converge onto the work surface 102 when the bucket is in the lowered positon and adjacent the work surface. The expected contact point 142 typically defines a line, and the size and shape of the region that is the expected contact point will depend upon the shape of the bucket 126 or other tool employed; in this description the term contact point will be used broadly to cover any shape region, whether point, linear, curved or other. To accurately aim the illumination devices 172, the contact point 142 can be premeasured and determined due to the fixed length of the implement arm 124 that fixes the location of the expected contact point 142 with respect to the machine frame 110.

In an embodiment, the illumination devices 172 can be aimed or calibrated when the loading machine 100 is on a horizontal plane with zero grade or slope and the bucket 126 is in the lowered position. The illumination devices 172 can be adjusted so that the visible fiducial beam 174 projects the fiducial indication 176 onto the cutting edge of the bucket 126. The illumination devices 172 can be fixed in that position so that the fiducial indication 176 will indicate the expected contact point 142 when the loading machine 100 is on a plane work surface 102. In an embodiment, the connection between the illumination devices 172 and the machine frame 102 can be adjustable to adjust the angle of projection of the visible fiducial beam for different operating circumstances and different work sites.

Examples of suitable illumination devices 172 that can be used with the visual reference system 170 include incandescent bulbs, LED lamps comprised of light emitting diodes, lasers, fluorescent lamps, or other devices capable of producing and transmitting a beam of light. The beam of light that corresponds with the visual fiducial beam 174 that projects the fiducial indication 176 on the work surface 102 can be a narrow beam to more precisely correspond to and more accurately outline the expected contact point 142 where the bucket 126 will converge with the work surface 102. For example, the illumination device 172 can include lenses or other structures to focus the visible fiducial beam 174 into the fiducial indication 176. The fiducial indication 176 can be in the shape of a narrow rectangle that closely corresponds to the location where the working edge 136 of the bucket 126 will converge with the work surface 102 when in the lowered position and the illumination devices 172 can thereby accurately illuminate and visibly indicate the expected contact point 142.

The illumination devices 172 can produce visible light in any suitable portion of the visible spectrum. For example, the illumination device 172 may generate light in the color or shade of red, which may be easily visibly perceptible and may be visible during daytime operation of the loading machine 100. The illumination devices 172 may include color change filters so that the color of the visible fiducial marker 174 may be selectively changed depending on the operating conditions of the loading machine 100 and preferences of the operator. In an embodiment, a plurality of illumination devices 172 can be disposed on the front end 114 of the machine frame 110. Use of a plurality of illumination devices 172 can ensure that the width and shape of the fiducial indication 176 corresponds to the expected contact point 142 between the working edge 136 and the work surface 102. Moreover, the width of the fiducial indication 176 can correspond to the width of the working edge 136 and designate the terminal sides of the bucket 126.

In an embodiment, the loading machine 100 may include a plurality of additional illumination devices or boundary lights 178. The boundary lights 178 may be disposed about the machine frame at various locations to project light beams from the sides of the loading machine toward the work surface to indicate the boundaries in which the loading machine is operating.

While the foregoing description has been made with respect to a loading machine with a bucket, it will be appreciated that the visual reference system can be applicable to other types of machines. For example, a dozer is a type of machine that includes a blade having a working edge that can be vertically articulated to raise and lower the working edge with respect to a work surface. The visual reference system can include one or more illumination devices to project a visible fiducial beam to indicate the contact point between the working edge and the work surface when the blade is vertically articulated to a lowered position.

INDUSTRIAL APPLICABILITY

Figure 3:
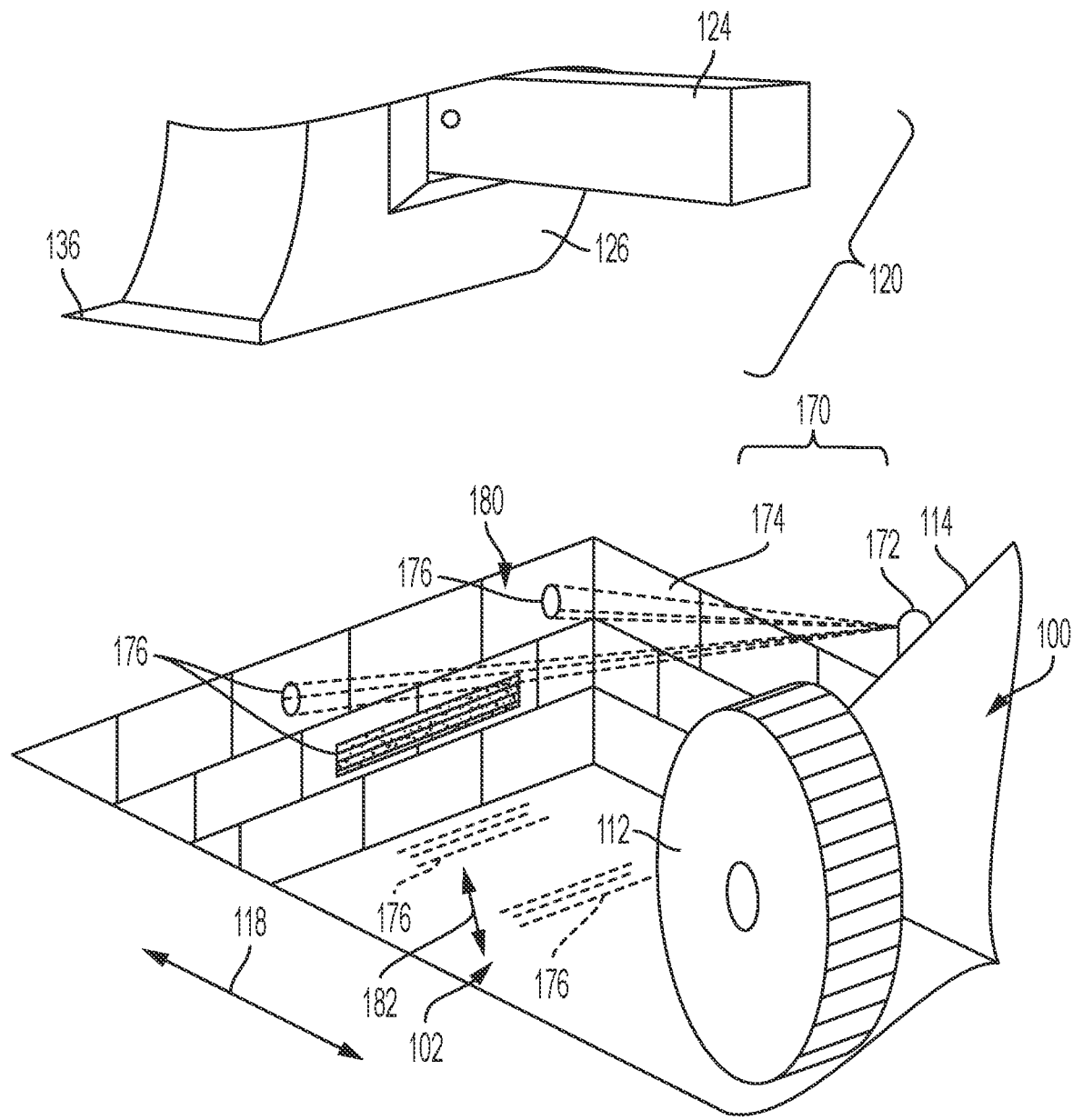
FIG. 3 is a perspective view of a loading machine in relation to an embankment with the illumination device projecting a visible fiducial beam to indicate the spatial relation between the lifting implement and the embankment.

The visual reference system 170 can assist in operation of the wheel loader 100 in various ways. Referring to FIG. 3, there is illustrated a loading machine 100 conducting a material handling operation where various objects such as vertical walls or embankments 180 are located about the work site. The visual reference system 170 can assist operation of the loading machine 100 by providing a visual indication that the loading machine is positioned so that bucket 126 will clear the embankments or other obstacles when vertically raised or lowered with respect to the work surface 100. For example, if the fiducial indications 176 produced by the illumination devices 172 are projected and visible on the embankment 180, that may indicate to the operator that the loading machine 100 is at a position where lowering the lifting implement 120 will result in the bucket 126 striking the embankment 180. When the loading machine 100 has been moved to a position where the fiducial indications 176 are projected and visible on the work surface 102 that may indicate to the operator that the bucket 126 can be lowered to the work surface without striking the embankment 180. The visible fiducial beams 174 can provide similar indication of the position of the bucket 126 with respect to a loading hopper or haul truck being loaded with material.

In an embodiment, the work surface 102 can be disposed on a sloped angle, either inclined or declined, with respect to the travel direction 118 of the loading machine 100 as indicated by arrow 182. To provide an indication as to the slope of the work surface where the visual reference system 170 includes a plurality of illumination devices 172, the illumination devices may be offset at different elevations or located at different vertical positions on the front end 114 of the machine frame. Accordingly, the visible fiducial beams 174 can be aligned at different projection angles towards the work surface 102. If the fiducial indications 176 produced by the illumination devices 172 appear at vertically and/or longitudinally offset locations on the work surface 102, in other words, the fiducial indications are not aligned, that may provide an indication as to the plane or grade of the work surface 102 and that the approaching slope may be different than the slope on which the loading machine is presently located.

Figure 4A:
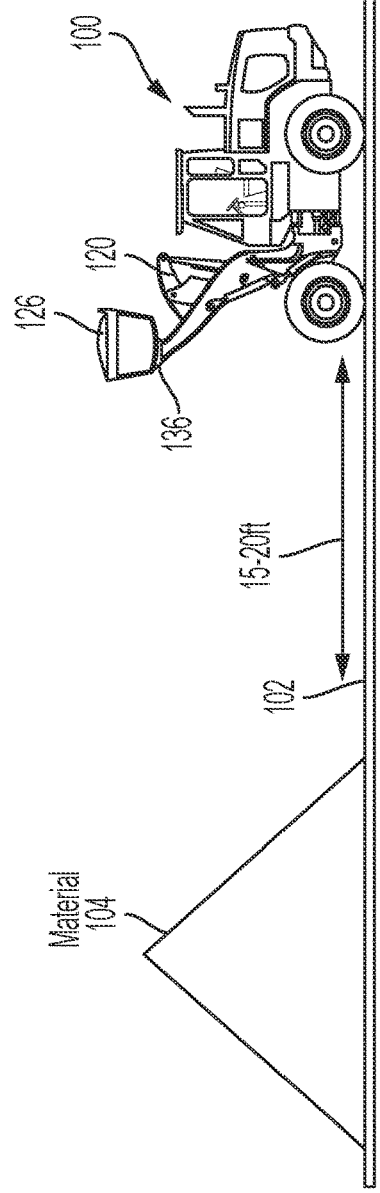
FIGS. 4A and 4B are schematic diagrams representing the loading machine approaching a pile of material with the visible fiducial beam indicating the distance between the loading machine and the pile.
Figure 4B:
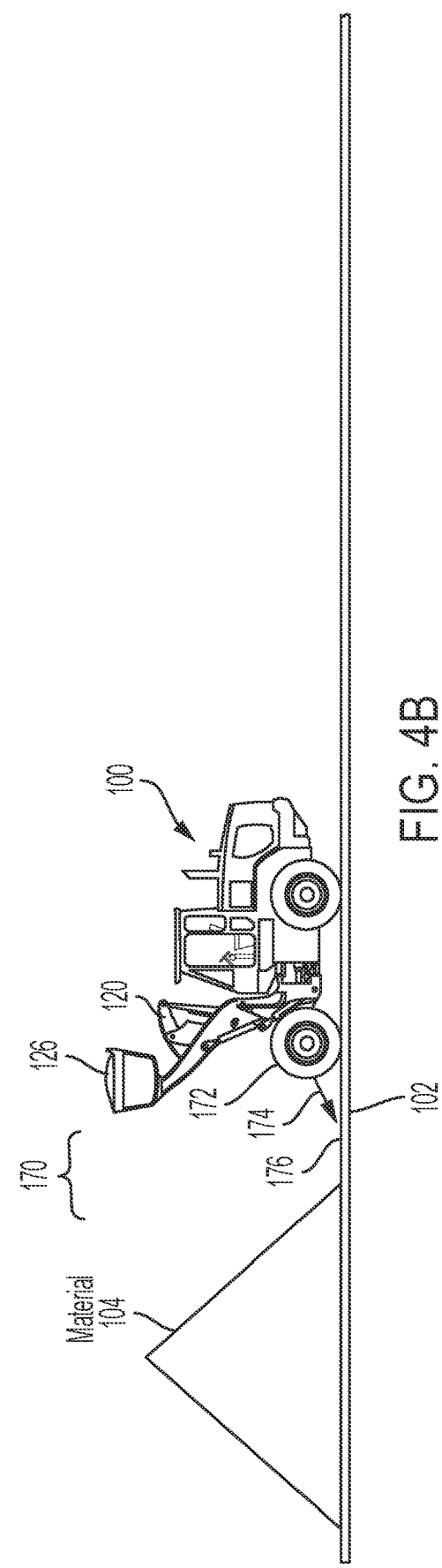

Referring to FIG. 4, there is illustrated the manner in which the visual reference system 170 can assist by providing added depth perception during operation of the loading material, which may be particularly beneficial during remote operation. For example, during a loading or dumping operation, the loading machine 100 may be approaching or backing away from a pile 104 of material. Due to poor depth perception and difficultly in accurately estimating the distance between the loading machine 100 and the pile 104, the operator may position the loading machine approximately 15-20 feet away from the pile 104 before vertically raising or lowering the lifting implement 120 to the optimal vertical height for the remainder of the operation. For example, when the lifting implement 120 is in the vertically raised position, the loading machine 100 should not travel at significant speeds about the worksite due to stability concerns. Likewise, the lifting implement 120 should not be moved to the lowered position where the bucket 126 is adjacent to the work surface 102 until just before the bucket impacts the pile 104. Traveling with the bucket 126 adjacent to the work surface 102 results in wear of the working edge 136 and decreases the life of the bucket.

With the visual reference system 170, when the fiducial indications 176 projected by the illumination devices 172 are closely aligned with the edge of the pile 104 on the work surface 102, that may indicate that the wheel loader 100 is at the optimal distance with respect to pile 104 to lower the lifting implement 120. The bucket 126 can engage the pile 104 and the wheel loader 100 can perform the loading operation in an optimal manner and reduce wear to the working edge 136 of the bucket 126. The visual reference system 170 can further reduce cycle times by enabling the wheel loader 100 to move more efficiently about the work site.

The disclosure thus provides a visual reference system using illumination devices that project a visible fiducial beam indicative of the expected contact point where the bucket of a loading machine will contact the work surface. In particular, the visual reference system provides a clearance functionality and can assist the operator by indicating when the loading machine is in a correct position such that the bucket will clear various obstacles and can be safely raised or lowered. The visual reference system also provides a depth perception functionality by enabling the operator to more accurately assess the distance between the loading machine and, for example, a pile or loading hopper. The operator can then raise or lower the lifting implement with respect to the work surface at an opportune time. These and other possible advantages and benefits of the visual reference system should be apparent from the foregoing detailed description and figures.

It will be appreciated that the foregoing description provides examples of the disclosed system and technique. However, it is contemplated that other implementations of the disclosure may differ in detail from the foregoing examples. All references to the disclosure or examples thereof are intended to visually reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A loading machine comprising:
a machine frame disposed on a plurality of propulsion devices for propelling the loading machine over a work surface;
an operator station disposed on the machine frame at a position to provide visibility over the work surface;
a lifting implement having a fixed distance between a proximal end connected to the machine frame by a pivot joint to articulate the lifting implement with respect to the machine frame and a distal end connected to a bucket; and
a visual reference system including an illumination device disposed on the machine frame and configured to project a visible fiducial beam to indicate an expected contact point between the bucket and the work surface based on the fixed distance of the lifting implement.

2. The loading machine of claim 1, wherein the bucket includes a working edge and the visible fiducial beam projects a fiducial indication of where the working edge will contact the work surface when the bucket is lowered adjacent the work surface.

3. The loading machine of claim 2, wherein the fiducial indication is generally shaped as a rectangle.

4. The loading machine of claim 3, wherein the fiducial indication corresponds to a width of the working edge.

5. The loading machine of claim 1, wherein the visual reference system includes a plurality of illumination devices.

6. The loading machine of claim 5, wherein the plurality of illumination devices are disposed on the machine frame so that the visible fiducial beams are projected toward the work surface at different projection angles to indicate the slope of the work surface.

7. The loading machine of claim 1, wherein the loading machine is configured for remote control.

8. The loading machine of claim 7, further comprising a camera disposed on the machine frame and configured to capture a visual image of the expected contact point between the bucket and the work surface indicated by the visible fiducial beam.

9. The loading machine of claim 8, wherein the camera is operatively associated with a transponder to communicate with a remote control having a visual display to reproduce the visual image.

10. The loading machine of claim 1, wherein the loading machine is a bucket loader.

11. A system for remote control of a loading machine comprising:
a loading machine including:
a machine frame supported on a plurality of propulsion devices for propelling the machine over a work surface;
a lifting implement connected to the machine frame by a pivot joint to vertically articulate with respect to the machine frame and to a bucket, the rigid implement arm having a fixed distance between the connection to the machine frame and the connection to the bucket;
a camera disposed on the machine frame and configured to capture a visual image of the bucket when lowered to an expected contact point adjacent the work surface;
an illumination device disposed on the machine frame and configured to project a visible fiducial beam to illuminate the expected contact point prior to contact of the bucket with the work surface based on the fixed distance of the rigid implement arm;
a remote control in communication with the camera and including a visual display to reproduce the visual image including the expected contact point indicated by the visible fiducial beam.

12. The system of claim 11, wherein the bucket includes a working edge and the visible fiducial beam projects a fiducial indication of where the working edge will contact the work surface when the bucket is lowered adjacent the work surface.

13. The system of claim 12, wherein the fiducial indication is generally shaped as a rectangle.

14. The system of claim 11, wherein the loading machine includes a plurality of illumination devices.

15. The system of claim 14, wherein the plurality of illumination devices are disposed on the machine frame so that the visible fiducial beams are projected toward the work surface at different projection angles to indicate the slope of the work surface.

16. A machine comprising:
a machine frame disposed on a plurality of propulsion devices to propel the machine over a work surface;
a work implement connected to the machine frame by a pivot joint to vertically articulate the work implement with respect to the machine frame, the work implement including a working edge spaced at a fixed distance from the pivot joint; and
a visual reference system including an illumination device disposed on the machine frame and configured to project a visible fiducial beam to indicate an expected contact point between the working edge and the work surface based on the fixed distance of the work implement.

17. The machine of claim 16, wherein the visible fiducial beam projects a fiducial indication of where the working edge will contact the work surface when the work implement is lowered adjacent the work surface, the fiducial indication corresponding to a width of the working edge.

18. The machine of claim 17, wherein the fiducial indication is generally shaped as a rectangle.

19. The machine of claim 16, wherein the visual reference system includes a plurality of illumination devices.

* * * * *